H. S. KERR.

SPONGE-BRUSH.

No. 7,181.

Reissued June 20, 1876.

Witnesses:

Lewis F. Brous,

A. P. Grant.

Inventor:

Hugh S. Kerr.

by John A. Jaderstein

Attorney.

N. PETERS, PHOTO-LITHOGRAPHER, WASHINGTON, D. C.

UNITED STATES PATENT OFFICE.

HUGH S. KERR, OF PHILADELPHIA, PENNSYLVANIA.

IMPROVEMENT IN SPONGE BRUSHES.

Specification forming part of Letters Patent No. 126,399, dated May 7, 1872; reissue No. 6,692, dated October 11, 1875; reissue No. 7,181, dated June 20, 1876; application filed May 4, 1876.

*To all whom it may concern:*

Be it known that I, HUGH S. KERR, of the city and county of Philadelphia, and State of Pennsylvania, have invented a new and useful Improvement in Brushes; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1:
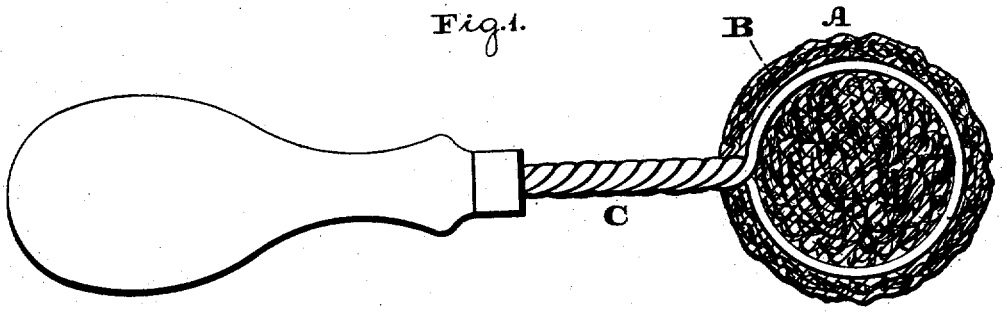
Figure 2:
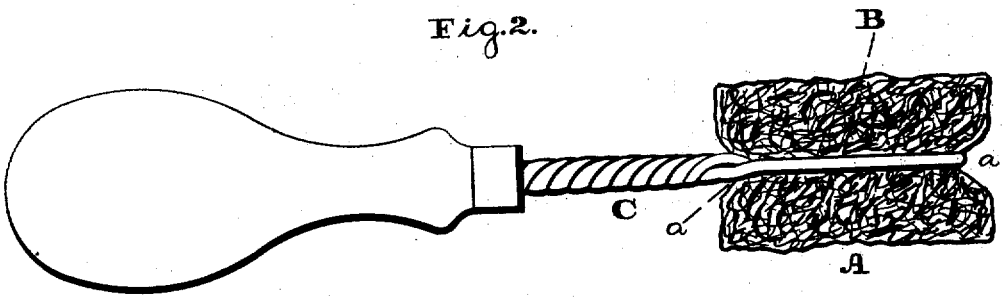

Figure 1 is a central section of the brush-head, with the holding-ring in place. Fig. 2 is a side view thereof.

Similar letters of reference indicate corresponding parts in the two figures.

My invention relates to improvements in the class of brushes known as sponge brushes; and it consists of the head of sponge formed with a circumferential groove, for properly locating the encircling loop of the handle, securely retaining said loop in position, and preventing compression of the sponge. It also consists of a length of wire bent into a loop for encircling the sponge head, and brought together to form a double-and-twisted shank.

Referring to the drawings, A represents a head consisting of a piece of sponge, in the circumference of which is cut a groove, *a*, for the reception of an encircling loop, B, whose diameter is less than the diameter or thickness of the head. A piece of wire is bent into the loop B, and its lengths or ends are brought together, so as to form a double shank, C, which affords means for attachment of a handle, or it acts there as for properly manipulating the brush.

It will be seen that the sponge presents two working faces. The loop does not project beyond the surfaces of the head, and scratch articles to which the brush is applied. The sponge is not compressed, but possesses the same elasticity throughout, and one of the ends of the wire is not exposed in the head, whereby piercing or cutting by said end is avoided.

In order to lock the loop and prevent its opening the shank is twisted, and thus the sponge head will be held in a simple, inexpensive, and reliable manner.

Having thus described my invention, what I claim as new, and desire to secure by Letters Patent, is—

1. The brush having a head, A, of sponge, with a circumferential groove, *a*, for the encircling loop of the handle, substantially as and for the purpose set forth.

2. The sponge-head holder, consisting of the loop B and the double-and-twisted shank C, continuous thereof, and formed of a single piece of wire, substantially as and for the purpose set forth.

3. The sponge head A, with circumferential groove *a*, in combination with the wire loop B and shank C, continuous of each other, substantially as and for the purpose set forth.

H. S. KERR.

Witnesses:
JOHN A. WIEDERSHEIM,
A. P. GRANT.